UNITED STATES PATENT OFFICE.

RALPH E. VALENTINE, OF WORCESTER, MASSACHUSETTS.

PROCESS OF PREPARING CEREAL FOOD PRODUCTS.

1,034,169.   Specification of Letters Patent.   Patented July 30, 1912.

No Drawing.   Application filed May 20, 1905. Serial No. 261,362.

*To all whom it may concern:*

Be it known that I, RALPH E. VALENTINE, a citizen of the United States, residing at Worcester, in the county of Worcester and State of Massachusetts, have invented certain new and useful Improvements in Processes of Preparing Cereal Food Products; and I do hereby declare the following to be a full, clear, and exact description of the invention, such as will enable others skilled in the art to which it appertains to make and use the same.

This invention relates to a novel process for preparing cereal food products, and more especially relates to the preparation of a cereal food product made of oats.

The present invention has for its object to provide an economical process for preparing a cereal food product made of oats and consisting of the whole of the oat kernel, thus preserving the kernel in its entirety and enabling the oats to be placed upon the market in such form as to free them from liability of deterioration and fermentation.

The invention further aims to provide a process of the character stated by which a product may be obtained which will be perfectly pure and unadulterated.

Further, the invention also has for its object the provision of a process for the production of a cereal food which when made will be thoroughly cooked, and therefore free from germs; one which will be highly palatable and more readily assimilated than any other of the oat products; and one in which the constituency and nutritive value of the cereal is effectually preserved.

Having these general objects in view, and others which will appear as the nature of the improvements is better understood, the invention consists in the novel process hereinafter fully described and pointed out in the appended claims.

In practicing the herein-described process a good quality of oats, preferably white oats, is first selected, and from these the foreign substances and impurities are removed. This may be accomplished by any of the well known cleaning processes, but it is desirable that the cleaning step shall include washing the oats, inasmuch as, by washing, the oats will absorb a certain percentage of moisture, and this has an advantageous effect in preserving the constituency and nutritive value of the cereal.

Having freed the oats of impurities and foreign substances, the same are subjected to a thorough cooking, which generally requires from twenty-five to thirty-five minutes, the exact time being determined by an examination of the center of the oat kernel, and at the point at which the floury constituency of the kernel disappears and becomes opaque, the cooking process should be discontinued. The cooking may be done by boiling, either under steam pressure, or in an open kettle, and this being done rapidly and thoroughly, the starch is partially converted, due to the heating and bursting of the starch cells, and consequently the oats are more easily digested. The product is also sterilized by the cooking, thereby freeing the same from germs. If desired, salt may be added as the oats are cooked.

After the oats are sufficiently cooked, the same are subjected to a drying process to an extent necessary to dry thoroughly the hulls, whereupon the hulls are removed from the kernels and separated by the ordinary process. The cooking being done before the hulls are removed makes it possible to preserve the individual kernels, and thus prepare cooked oats for the market in a form which is not liable to deterioration and fermentation. Furthermore, the cooking with hulls on, to a great extent, prevents any loss in the nutritive value of the cereal.

If, by the drying above referred to, the kernels of the oats are not thoroughly dried, the hulls, which have a tendency to curl away from the kernels, may be readily removed without breaking the kernels, as the latter, being left in a moist and less brittle condition, are less apt to be broken and wasted; but under such circumstances it is necessary to thoroughly dry the kernels to completely free them of moisture.

When the kernels have been dried to the desired extent, the same are subjected to a scouring process, by which the fuzzy outer coating becomes removed, thus cleaning the kernels entirely, and after this has been accomplished the dry and clean kernels are reduced, preferably by a suitable cutting machine, into pieces of a uniform size. After being cut, the kernels, treated as described, constitute the finished product and are in a granulated state, in which condition they are ready for the market and may be prepared for table use by simply using hot water, or, if desired, the product may be further cooked in the usual manner.

The cereal food product herein-described forms the subject-matter of a companion application concurrently filed herewith, Serial No. 261,363.

Having thus described the invention, what is claimed as new, and desired to be secured by Letters Patent, is—

1. In the process of preparing a cereal food from oats, the steps consisting in cooking the oats while in the hulls to preserve the characteristic form of the kernels, and removing the hulls from the kernels.

2. In the process of preparing a cereal food from oats, the steps consisting in cleaning and washing the oats to free the same from foreign substances and to impart to the oats a percentage of moisture, cooking the oats while in the hulls to preserve the form of the kernels, drying the oats to free the hulls from moisture, removing the hulls from the kernels, again drying the oats to free the kernels of any moisture retained thereby, and reducing the kernels to a granular state.

In testimony whereof I affix my signature, in the presence of two witnesses.

RALPH E. VALENTINE.

Witnesses:
JOSEPH E. ROCHETTE,
EDWIN H. CRANDELL, Jr.